United States Patent
Xie et al.

(10) Patent No.: US 6,865,497 B2
(45) Date of Patent: Mar. 8, 2005

(54) NET SYSTEM AND METHOD FOR QUALITY CONTROL

(75) Inventors: Yuhua Xie, Shenzhen (CN); Solo Xiao, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 218 days.

(21) Appl. No.: 10/155,202

(22) Filed: May 23, 2002

(65) Prior Publication Data

US 2003/0120446 A1 Jun. 26, 2003

(30) Foreign Application Priority Data

Dec. 26, 2001 (TW) ........................................ 90132401 A

(51) Int. Cl.⁷ .......................... G01N 37/00; G01F 19/00
(52) U.S. Cl. ....................................................... 702/84
(58) Field of Search .............................. 702/81, 84, 82, 702/179, 182; 700/108–111

(56) References Cited

U.S. PATENT DOCUMENTS

| | | | |
|---|---|---|---|
| 5,706,213 A | * | 1/1998 | Takakura et al. ............. 702/84 |
| 6,477,432 B1 | * | 11/2002 | Chen et al. .................... 700/51 |
| 6,539,271 B2 | * | 3/2003 | Lech et al. .................. 700/108 |
| 6,563,300 B1 | * | 5/2003 | Jackson et al. ........... 324/158.1 |
| 6,574,522 B1 | * | 6/2003 | Douglas ....................... 700/109 |
| 2002/0032541 A1 | * | 3/2002 | Raab et al. .................. 702/152 |
| 2003/0069885 A1 | * | 4/2003 | Chang et al. ................. 707/10 |
| 2003/0097371 A1 | * | 5/2003 | Tu et al. .................... 707/104.1 |

\* cited by examiner

Primary Examiner—John Barlow
Assistant Examiner—Demetrius Pretlow
(74) Attorney, Agent, or Firm—Wei Te Chung

(57) ABSTRACT

A network-based system and method for quality control is disclosed. The network-based system for quality control includes at least one measuring workstation (1), a web server (20), a measuring module (6), and a measurement information management module (7). Each measuring workstation includes a measuring instrument (10) and a measuring computer (12). The measuring module provides programmable measurement procedures that guide a corresponding measuring instrument to measure a product, and guide a corresponding measuring computer to obtain measurement information from the corresponding measuring instrument. The web server is electrically connected to the measuring computer via an electronic communications network (2) for receiving, accessing and storing the measurement information in a database (21). Users access and maintain information stored in the web server database via maintaining computers (3). The measurement information management module enables users to perform statistical charts analysis and generate various kinds of reports based on the measurement information.

20 Claims, 6 Drawing Sheets defining group authorities

503 →

| new | delete | edit | select all | cancel |

| NO. | select | group | user management | measuring | reporting | SPC charts analysis | ... |
|---|---|---|---|---|---|---|---|
| 1 | ☐ | system administrator | * | * | * | * | ... |
| 2 | ☑ | measuring engineer | * |  | * | * | ... |
| 3 | ☐ | supervisor |  |  | * | * | ... |
| ⋮ | ⋮ | ⋮ | ⋮ | ⋮ | ⋮ | ⋮ | ⋮ |

502  501  500

FIG. 3 assigning individual authorities

511 →

| new | delete | edit | cancel |

| user name | user's group | available groups |
|---|---|---|
| Zhang Li | supervisor | system administrator |
| Li Wang | measuring engineer | measuring engineer |
| ⋮ | ⋮ | supervisor |
|  |  | ⋮ |

| type | measurement value | tolerance | upper tolerance | lower tolerance | time |
|---|---|---|---|---|---|
| ☑ | P01L | 0.4525 | 0.45 | 0.025 | -0.025 | 2001/2/13 |
| ☑ | P02L | 3.1458 | 3.25 | 0.025 | -0.025 | 2001/2/13 |
| | | | | | | |
| | | | | | | |

NET SYSTEM AND METHOD FOR QUALITY CONTROL

FIELD OF THE INVENTION

This invention is related to net systems and methods for quality control, and especially to a network-based system and method for controlling product quality in manufacturing facilities.

BACKGROUND OF THE INVENTION

Many mass producers need to control the quality of their products throughout the entire manufacturing process. Conventionally, information on quality of products obtained from a production line is collected manually. All kinds of statistical charts, including Statistical Process Control (SPC) analysis charts, are then compiled on paper based on the collected information. However, these manual procedures are prone to human error. As a result, statistical charts analysis is frequently inaccurate and inefficient.

Recent extensive application of computer technology generally has also included the domain of quality control. It is now commonplace for personal computers to be connected to measuring instruments operating on a production line. Information on quality of products obtained from the measuring instruments is stored in the personal computer. Such systems reduce human error. Measuring instruments are generally located at a factory plant floor. A large manufacturer may have several factories operating in various localities. In such cases, a supervisory department of the manufacturer may be located remotely from the factory plant floors. Conventionally, the supervisory department cannot acquire information on quality in short time. The supervisory department cannot deal in a timely manner with abnormal production that may occur during any manufacturing process.

Accordingly, it is desired to provide a system and method for timely transfer of information on quality to a supervisory department, to enable the department to remotely perform real time quality control. A system and method that alerts users, including operators and supervisory departments, to timely deal with any abnormal production is also desired.

SUMMARY OF THE INVENTION

A primary object of the present invention is to provide a net system and method for quality control that reduces human error, improves the efficiency of quality control, and enables a supervisory department located remotely from a factory plant floor to access quality control information and perform real time quality control.

Another object of the present invention is to provide a net system and method for quality control which alerts users, including operators and supervisory departments, to timely deal with any abnormal production.

In one aspect of the present invention, a net system for quality control comprises at least one measuring workstation, a basic information module, a measuring module, a web server, a measurement information management module, an authorities management module, and a system tools module. Each measuring workstation comprises a measuring instrument for measuring products and generating measurement information, and a measuring computer electrically connected to the measuring instrument for obtaining the measurement information from the measuring instrument. The basic information module allows users to create basic information, including information on products and information on measuring instruments. The measuring module installed in the web server provides programmable measurement procedures that guide a corresponding measuring instrument to measure a product, and guide a corresponding measuring computer to obtain measurement information from the corresponding measuring instrument. The web server electrically connected to the measuring computer via an electronic communications network is for receiving, accessing and storing the measurement information in a database. The measurement information management module enables users to perform statistical charts analysis and generate various kinds of reports based on the measurement information. The authorities management module assigns different users different authorities, by which users can access and maintain the above information via maintaining computers. The system tools module is for performing backup of the measurement information in another database, and for restoring the backed up information in the web server database when needed.

In another aspect of the present invention, a net method for quality control comprises the following steps: providing a net system for quality control; creating basic information including information on measuring instruments and information on products to be measured; selecting a measuring instrument for a product to be measured; measuring the product and storing measurement information in a web server database; and maintaining the measurement information and performing statistical analysis based on the measurement information.

These and other objects and features of the present invention will become more fully apparent from the following description and appended claims, or may be learned by the practice of the invention as set forth hereinafter.

BRIEF DESCRIPTION OF THE DRAWINGS

FIG. 3 is a schematic view of a user interface for defining group authorities when using an authorities management module of the software architecture shown in FIG. 2;

FIG. 4 is a schematic view of a user interface for assigning group authorities to individuals when using the authorities management module of the software architecture shown in FIG. 2;

DETAILED DESCRIPTION OF THE PREFERRED EMBODIMENT

Figure 1:
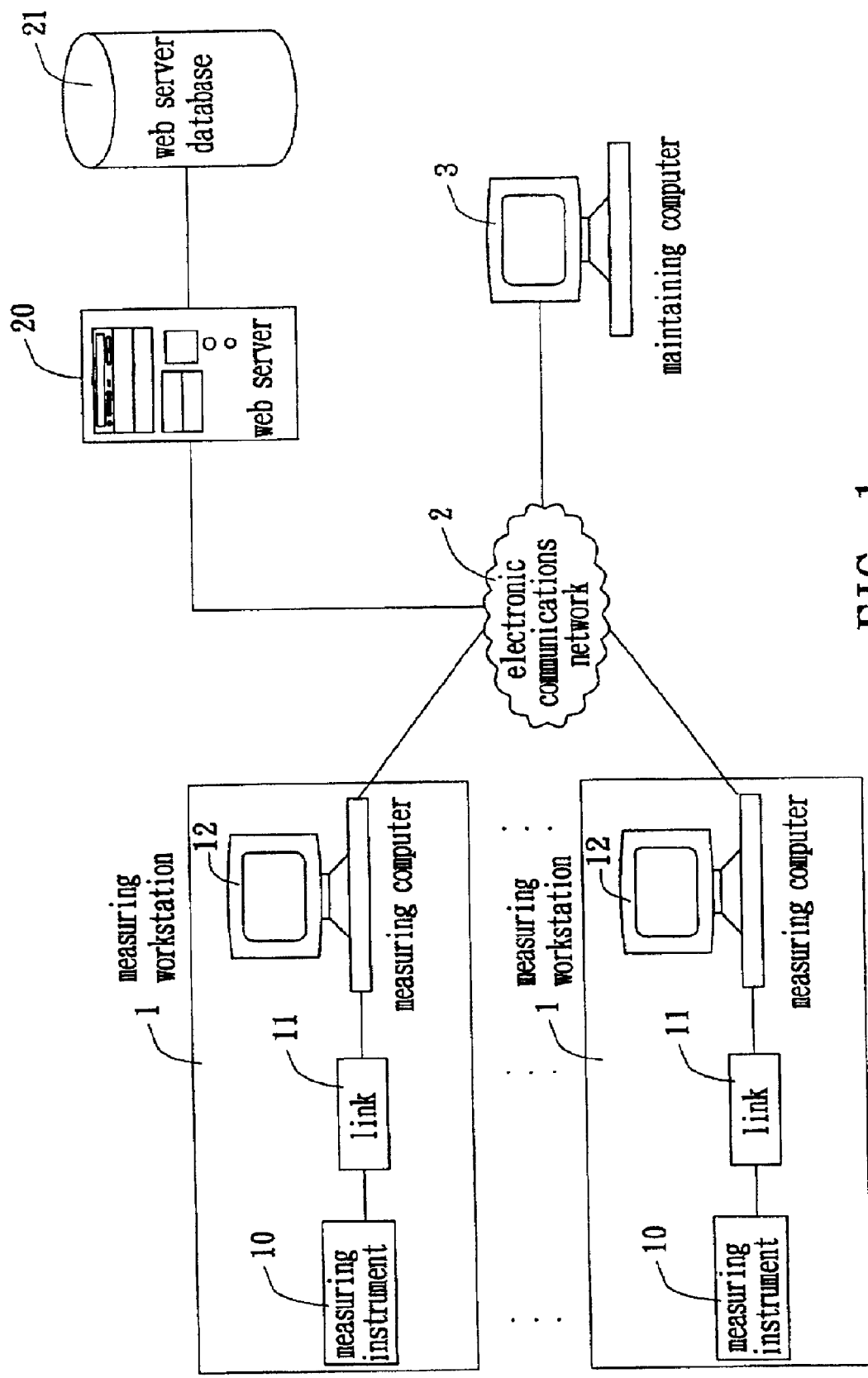
FIG. 1 shows hardware architecture of a net system for quality control in accordance with a preferred embodiment of the present invention.

FIG. 1 shows hardware architecture of a net system for quality control in accordance with a preferred embodiment of the present invention. The net system for quality control comprises a plurality of measuring workstations 1, an electronic communications network 2, a web server 20, a web server database 21, and several maintaining computers 3 (only one is shown for simplicity).

Each measuring workstation 1 includes a measuring instrument 10, a measuring computer 12, and a link 11 interconnecting the measuring instrument 10 and the measuring computer 12. The measuring instrument 10 may for example be a vernier caliper, a gauge, an altimeter or a three-D instrument, depending on characteristics of products to be measured. The measuring instrument 10 generates measurement information after finishing measurement of the products. The measuring computer 12 is a personal computer that obtains the measurement information from the measuring instrument 10. The link 11 comprises a message conversion apparatus, such as an analog-to-digital converter. The converter connects the measuring instrument 10 with the measuring computer 12. The converter converts the measurement information, such as an analog signal, into computer readable information.

The web server 20 is electrically connected to the measuring computers 12 via the electronic communications network 2 for receiving, accessing and storing the measurement information. The web server 20 includes the web server database 21 for storing all information needed by the net system for quality control. Measurement information obtained by each measuring computer 12 is stored in the web server database 21 via the electronic communications network 2. Each maintaining computer 3 is a personal computer that enables users, including supervisors and measuring engineers, to access and maintain information stored in the web server database 21 via the electronic communications network 2. In the preferred embodiment, to maintain information includes to newly add, to edit, to delete and to browse information.

Figure 2:
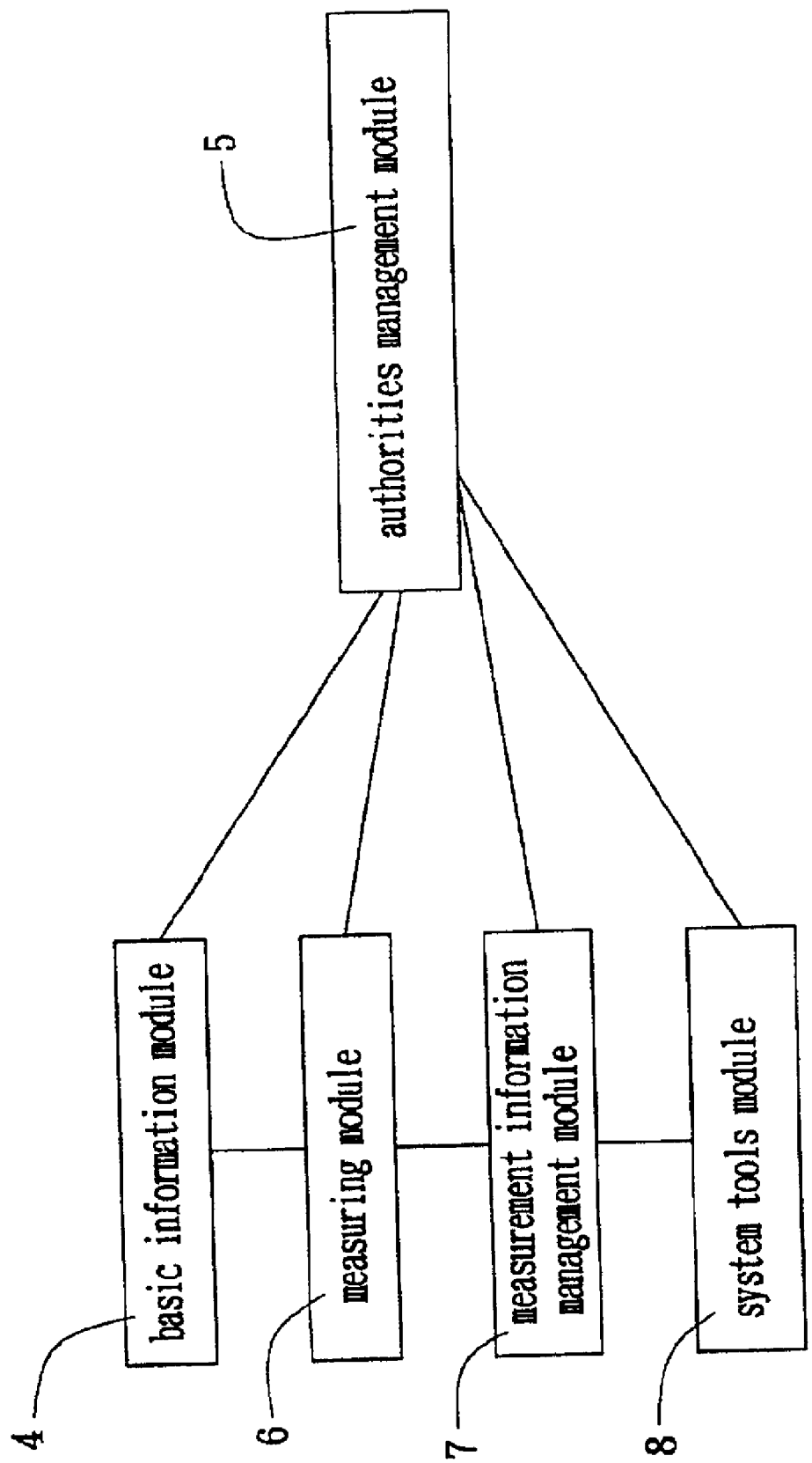
FIG. 2 shows software architecture of the net system for quality control in accordance with the preferred embodiment of the present invention.

Referring to FIG. 2, the net system for quality control further comprises a group of software stored in the web server database 21. The group of software comprises a basic information module 4, an authorities management module 5, a measuring module 6, a measurement information management module 7, and a system tools module 8.

The basic information module 4 is for creating and maintaining basic information, including information on the products to be measured and on the measuring instruments 10. The basic information module 4 provides all basic information needed by the net system for quality control.

The authorities management module 5 is for assigning different authorities to different users. In particular, the authorities management module 5 is for defining authorities of groups of users, and for assigning individual authorities. The basic information module 4, the measuring module 6, the measurement information management module 7 and the system tools module 8 operate based on the authorities management module 5, and can interact with one another. For example, the basic information module 4 provides information on products to be measured and information on measuring instruments 10 to the measuring module 6, and the measuring module 6 provides measurement information to the measurement information module 7.

FIGS. 3 and 4 respectively show a schematic view of a user interface 50 for defining group authorities when using the authorities management module 5, and a schematic view of a user interface 51 for assigning group authorities to individuals when using the authorities management module 5. Firstly, referring to FIG. 3, system administrators 500 define a plurality of different group authorities. Groups include system administrator 500, measuring engineer 501, and supervisor 502. For example, system administrators 500 can select a group such as measuring engineer 501, and double click any of the buttons 503 to perform a desired maintenance of the measuring engineer 501 group's authorities. Secondly, referring to FIG. 4, system administrators 500 assign one or more group authorities to each individual user based on the user's individual information. Each assigned group authority is selected from a menu of available groups that were defined as above. For example, system administrators 500 can select a user named Li Wang who currently has the authority of the measuring engineer group 501. System administrators 500 can double click any of the buttons 511 to perform a desired maintenance of Li Wang's authority. For example, Li Wang's authority of measuring engineer 501 may be changed to the authority of supervisor 502.

The measuring module 6 includes a plurality of programmable procedures stored in the web server database 21. The programmable procedures comprise measurement procedures and transforming procedures. Generally, the measuring instruments 10 may be classified into two types: a first type incorporating its own measurement procedure, such as a three-D measuring instrument; and a second type not incorporating its own measurement procedure, such as a vernier caliper. The measurement procedures apply to any instrument 10 that does not incorporate its own measurement procedure. The measurement procedures guide the measuring instrument 10 to measure the products, and guide the measuring computer 12 to obtain the measurement information from the measuring instrument 10 and to store the obtained measurement information in the web server database 21. The transforming procedures apply when any measuring instrument 10 incorporates its own measurement procedure, but the measurement results generated by the measuring instrument 10 are in a format which is inconsistent with a format of measurement information stored in the web server database 21. The transforming procedures transform the generated measurement results into a format such that the measurement results can be stored in the web server database 21.

Figures 5, 6:
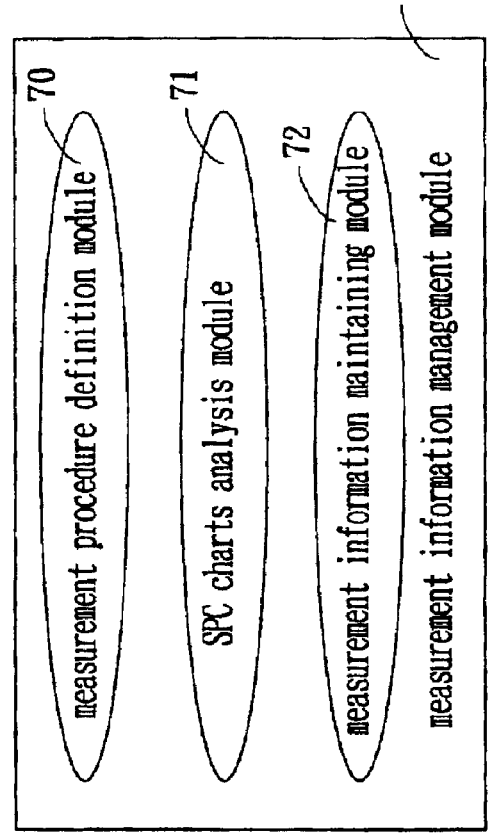
FIG. 5 is a schematic view of a user interface showing measurement results, in accordance with the preferred embodiment of the present invention.
FIG. 6 is a block diagram of modules comprised in a measurement information management module of the software architecture shown in FIG. 2.

FIG. 5 is a schematic view of a user interface showing measurement results. Each kind of product has a predetermined group of tolerances including a tolerance 61, an upper tolerance 62, and a lower tolerance 63. If a value of a measurement exceeds the upper tolerance 62 or the lower tolerance 63, the measuring module 6 automatically turns an icon 64 red and generates a sonic alarm indicating that an abnormality must be dealt with. The measuring module 6 further provides for intervention if a product required to be measured is not measured. When this occurs, the measuring module 6 automatically generates a sonic alarm indicating that the product requiring measurement has not been measured.

The system tools module 8 (see FIG. 2) provides for backup of measurement information. In a typical application in which the net system for quality control operates, a volume of measurement information stored in the web server database 21 may become so great that the net system for quality control becomes less efficient. Therefore, the system tools module 8 enables users to backup relatively unimportant measurement information in another database (not shown), to improve efficiency of the net system for quality control. When the backed up information is needed, the system tools module 8 can restore the backed up information in the web server database 21.

Referring to FIG. 6, the measurement information management module 7 comprises a measurement procedure definition module 70, a Statistical Process Control (SPC) charts analysis module 71 and a measurement information maintaining module 72.

The measurement procedure definition module 70 enables users to define measurement procedures and store the measurement procedures in the web server database 21. The measurement procedures define what kind of measuring instruments 10 are needed for measuring a product, how each measuring instrument 10 automatically measures the products, and how the measuring computer 12 automatically obtains measurement information from each measuring instrument 10. The measurement procedure definition module 70 enables measuring engineers to update and otherwise maintain the measurement procedures stored in the web server database 21.

Figure 7:
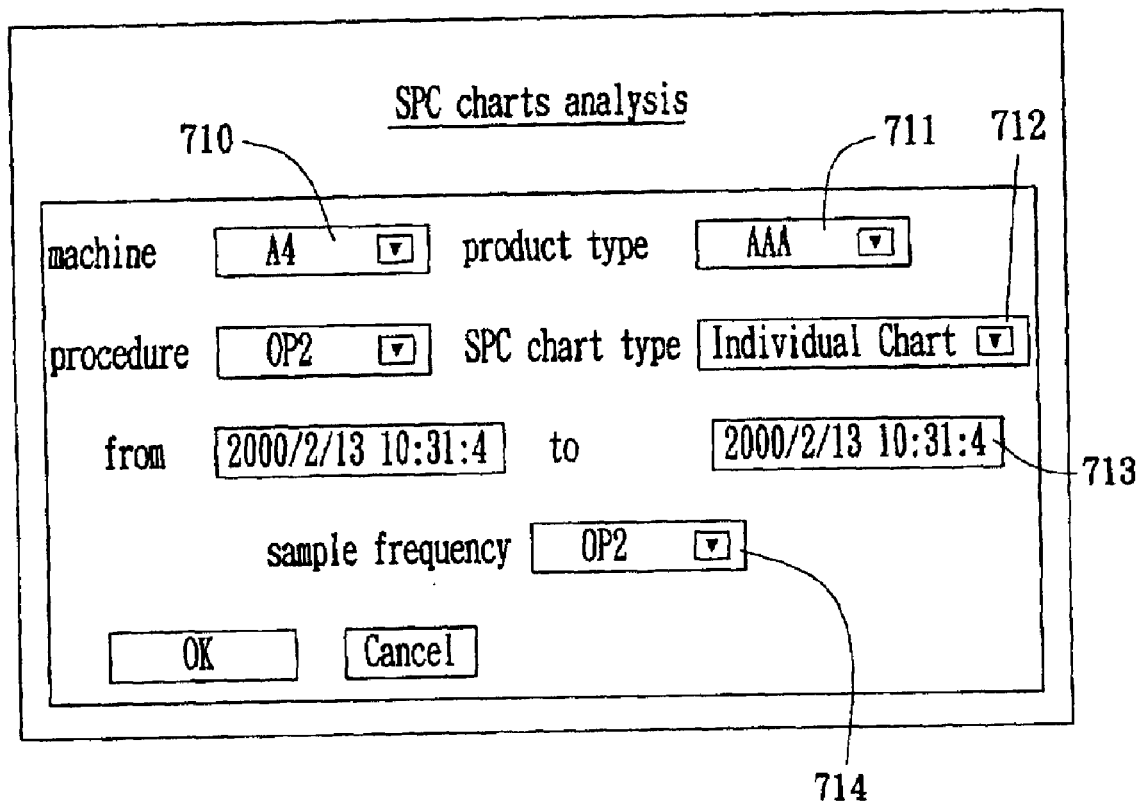
FIG. 7 is a schematic view of a user interface for SPC charts analysis in accordance with the preferred embodiment of the present invention.

The SPC charts analysis module 71 provides for all kinds of SPC charts analysis based on measurement information stored in the web server database 21. FIG. 7 is a schematic view of a user interface for SPC charts analysis 719. Parameters such as machine 710, product type 711, SPC chart type 712, time range 713 and sample frequency 714 are selected. The OK button is clicked, and a desired kind of SPC chart is automatically generated. Examples of SPC charts include X bar-R charts, X~-R charts, individual charts, X bar-S charts, P charts, C charts and histograms.

The measurement information maintaining module 72 provides for maintaining the measurement information and printing labels which indicate that the measured products are satisfactory.

The measurement information management module 7 further provides for generating reports based on the measurement information stored in the web server database 21, other than SPC charts analysis reports. The reports may be generated according to any of a variety of predetermined formats.

Figure 8:
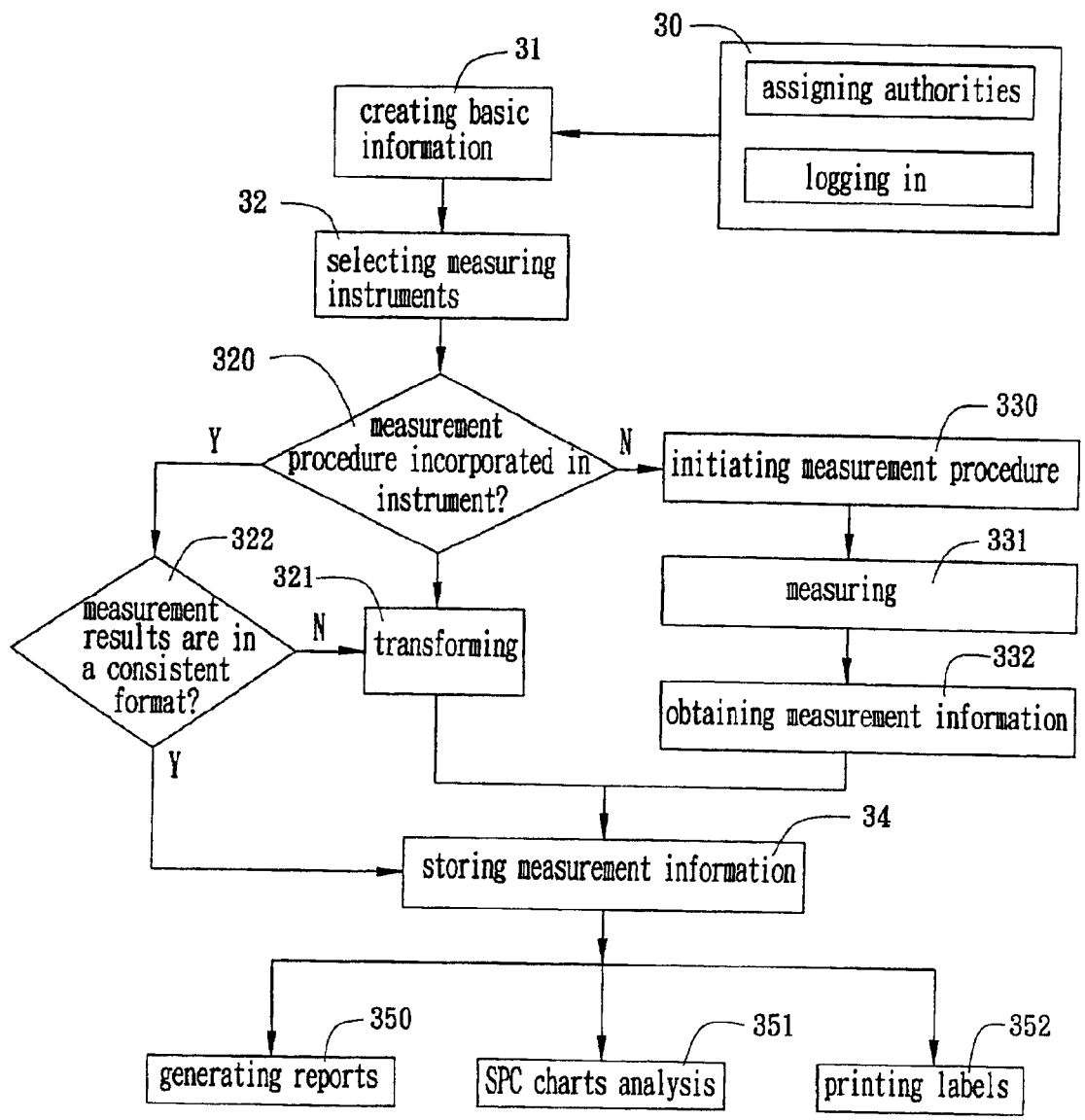
FIG. 8 is a flow chart of a procedure for quality control in accordance with a preferred embodiment of the present invention.

FIG. 8 is a flow chart of a procedure for quality control in accordance with a preferred embodiment of the preset invention. Firstly, system administrastors assign different authorities to different users, and users log into the net system for quality control based on their authorities (step 30). Users create basic information based on their authorities (step 31). The basic information includes product information and measuring instrument information. When products require measurement, measuring engineers select a measuring instrument 10 for each type of product to be measured (step 32). Measuring engineers determine whether the selected measuring instrument 10 incorporates its own measurement procedure (step 320). If the step 320 determination is Yes, the measuring engineers determine whether the measurement results are in a format that is consistent with a specific format of the measurement information stored in he web server database 21 (step 322). If the step 322 determination is Yes, measurement information generated by the measuring instrument 10 is directly stored in the web server database 21 (step 34). If the step 322 determination is No, measurement information generated by the measuring instrument 10 is transformed into a required consistent format (step 321) and stored in the web server database 21 (step 34). If the step 320 determination is No, the measuring engineers initiate a measurement procedure according to the selected measuring instrument (step 330). The products are measured by the measuring instrument 10 (step 331). The measuring computer 12 automatically obtains the measurement information (step 332), and stores the measurement information in the web server database 21 (step 34). Users access the measurement information via the electronic communications network 2 to generate various kinds of reports according to their particular needs (step 350), to perform SPC charts analysis based on the measurement information (step 351), and to print labels if the measured products are satisfactory (step 352). When a report is generated which indicates that the measured products are unsatisfactory, the report may also generates a sonic alarm indicating such.

The embodiment described herein is merely illustrative of the principles of the present invention. Other arrangements and advantages may be devised by those skilled in the art without departing from the spirit and scope of the present invention. Accordingly, the present invention should be deemed not to be limited to the above detailed description but rather by the spirit and scope of the claims that follow, and their equivalents.

What is claimed is:

1. A net system for quality control comprising:
   at least one measuring workstation, wherein each of the workstations comprises a measuring instrument for measuring products and generating measurement information, and a measuring computer electrically connected to the measuring instrument;
   a web server electrically connected to the measuring computer via an electronic communications network for receiving, accessing and storing the measurement information;
   a measuring module installed in the web server for providing a measurement procedure which guides a corresponding measuring instrument to measure a product, and guides a corresponding measuring computer to obtain measurement information from the corresponding measuring instrument and to store the obtained measurement information in the web server; and
   a measurement information management module installed in the web server for maintaining the measurement information and performing statistical analysis based on the measurement information.

2. The net system for quality control as claimed in claim 1, wherein the web server comprises a web server database installed therein for storing the measurement information.

3. The net system for quality control as claimed in claim 1, further comprising a system tools module for backup of the measurement information.

4. The net system for quality control as claimed in claim 1, further comprising an authorities management module for assigning different authorities to different users.

5. The net system for quality control as claimed in claim 1, further comprising a basic information module for creating and maintaining basic information including information on the measuring instrument and information on products to be measured.

6. The net system for quality control as claimed in claim 2, wherein the measurement information management module comprises a measurement procedure definition module enabling measuring engineers to update measurement procedures and to store the measurement procedures in the web server database.

7. The net system for quality control as claimed in claim 1, wherein the measurement information management module comprises a statistical process control charts analysis module for performing statistical charts analysis.

8. The net system for quality control as claimed in claim 2, wherein the measuring module provides a procedure for transforming measurement information from a first format to a second format if the first format of the measurement information is not consistent with a format of the measurement information stored in the web server database.

9. The net system for quality control as claimed in claim 1, wherein the measuring module generates a sonic alarm when a predetermined tolerance for a product is exceeded.

10. The net system for quality control as claimed in claim 1, wherein the measuring module generates a sonic alarm when a product required to be measured is not measured.

11. The net system for quality control as claimed in claim 1, wherein the measuring instrument is selected from the group consisting of vernier calipers, gauges, altimeters and three-D instruments.

12. A method for quality control comprising:
providing a net system for quality control;
creating basic information including information on measuring instruments and information on products to be measured;
selecting a measuring instrument for a product to be measured; determining whether the selected measuring instrument incorporates its own measurement procedure;
measuring the product and storing measurement information in a web server database; and
maintaining the measurement information and performing statistical analysis based on the measurement information.

13. The method as claimed in claim 12, further comprising the step of assigning different authorities to different users for the users to log into the net system for quality control based on respective assigned authorities.

14. The method as claimed in claim 12, further comprising the step of storing and updating a programmable measurement procedure in the web server database for guiding the selected measuring instrument to measure the product.

15. The method as claimed in claim 12, further comprising the step of determining whether a format of a measurement result generated from the measuring instrument is consistent with a format of measurement information stored in the web server database.

16. The method as claimed in claim 15, further comprising the step of transforming the measurement result into a format consistent with the format of the measurement information stored in the web server database, if the selected measuring instrument incorporates its own measurement procedure and the measurement result generated from the measuring instrument is in a format inconsistent with the format of the measurement information stored in the web server database.

17. The method as claimed in claim 12, further comprising the step of initiating a measurement procedure according to the selected measuring instrument, if the selected measuring instrument does not incorporate its own measurement procedure.

18. The method as claimed in claim 12, wherein the step of maintaining the measurement information and performing statistical analysis based on the measurement information comprises generating various kinds of reports, performing statistical process control charts analysis, and printing a label indicating that the product is satisfactory.

19. The method as claimed in claim 18, wherein generating various kinds of reports comprises generating a sonic alarm when a report indicates that the measured product is unsatisfactory.

20. A system for quality control comprising:
means for creating basic information including information on measuring instruments and information on products to be measured;
means for selecting measuring instruments for a specific product to be measured;
means for initiating a measurement procedure if no measurement procedure incorporated in said selected instruments is available; and
means for storing and analyzing obtained measurement information after said specific product has been measured via the selected measuring instruments and corresponding procedure.

* * * * *